Figure 1:
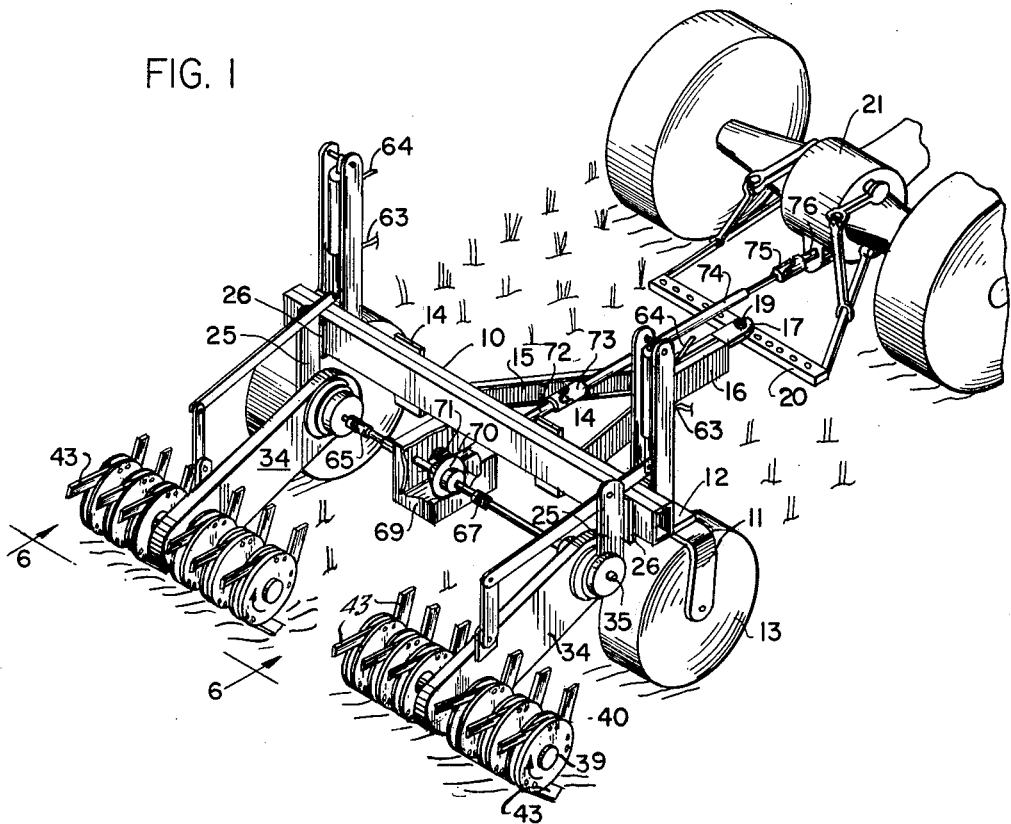

July 6, 1965 R. M. LANE 3,193,021
STALK MULCHING AND DISINTEGRATING MACHINE
Filed Aug. 23, 1962 3 Sheets-Sheet 1

INVENTOR
ROY M. LANE

BY *A. Yates Dowell III*
ATTORNEY

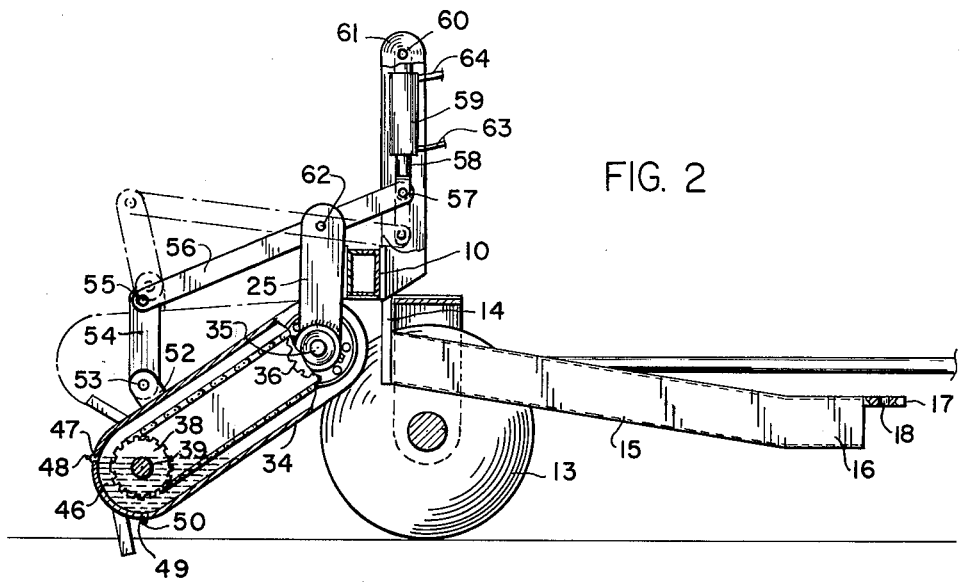
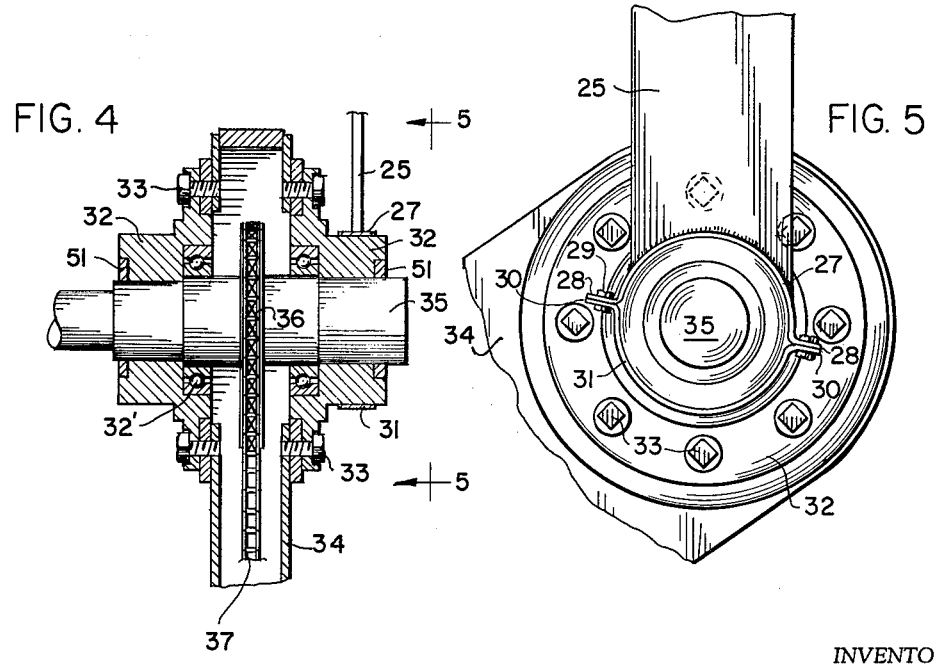

July 6, 1965  R. M. LANE  3,193,021
STALK MULCHING AND DISINTEGRATING MACHINE
Filed Aug. 23, 1962  3 Sheets-Sheet 3

INVENTOR
ROY M. LANE

BY
ATTORNEY

United States Patent Office 3,193,021
Patented July 6, 1965

3,193,021
STALK MULCHING AND DISINTEGRATING MACHINE
Roy M. Lane, 83 SE. 1st St., Belle Glade, Fla.
Filed Aug. 23, 1962, Ser. No. 219,077
1 Claim. (Cl. 172—60)

This invention relates to the harvesting and subsequent treatment of crops including the less desirable portions thereof, and to apparatus and equipment by which such harvesting and subsequent treatment may be accomplished.

The invention relates particularly to the harvesting of stalk crops such as cane or the like, and to mechanism designed to cut or harvest left over stalks of cane and to disintegrate or reduce in size all the parts of the cane left after the main harvesting operation to obtain a more thorough integration of the same with the soil to promote earlier enrichment thereof.

It has been customary to harvest in fields of cane as much as possible and subsequently to cover any cane left in the field for the fertilization of the soil. Decomposition and fertilization were slow and limited processes and resulted in a yield below that desired or considered reasonable for any particular soil.

It is an object of the invention to improve the abundance of the harvested crops or the like by the reduction in size or disintegration of cane or other growth left in the field thereby accelerating the enrichment of the soil and the supply of the essential nutrients therein and made available to subsequently growing crops.

Another object of the invention is to provide a combination harvester and mulcher which can be attached to and driven from a tractor or other motorized vehicle and of a character which not only will cut or harvest any cane or the like stalks left after the main harvesting operation, but which will reduce in size or disintegrate the cane left in the field in a manner to facilitate its accelerated decomposition or change of state and mixing with the earth to provide additional nourishment in the soil for subsequently growing crops.

A further object of the invention is to provide a device of the character indicated in which the operating members are of a particular configuration and by which the rotation, depth of penetration, and operating characteristics of such members may be readily controlled.

A still further object of the invention is to provide a combination harvester and mulcher including multiple heads attached to a common frame drawn by a propelling machine vehicle by which such heads may be individually raised and lowered as well as individually driven through a drive shaft and controlled with a gear box, an additional positive drive transmission, and with earth engaging members having relatively long straight portions which serve as breaking or cutting elements when they engage stalks of cane or the like and press them against the soil in a relatively straight line to provide a type of chopping action.

Figure 6:
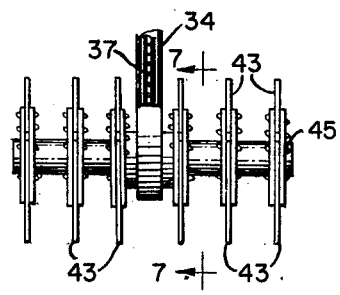
Figure 7:
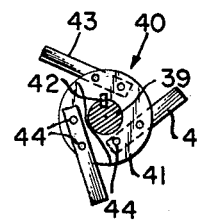
Figure 3:
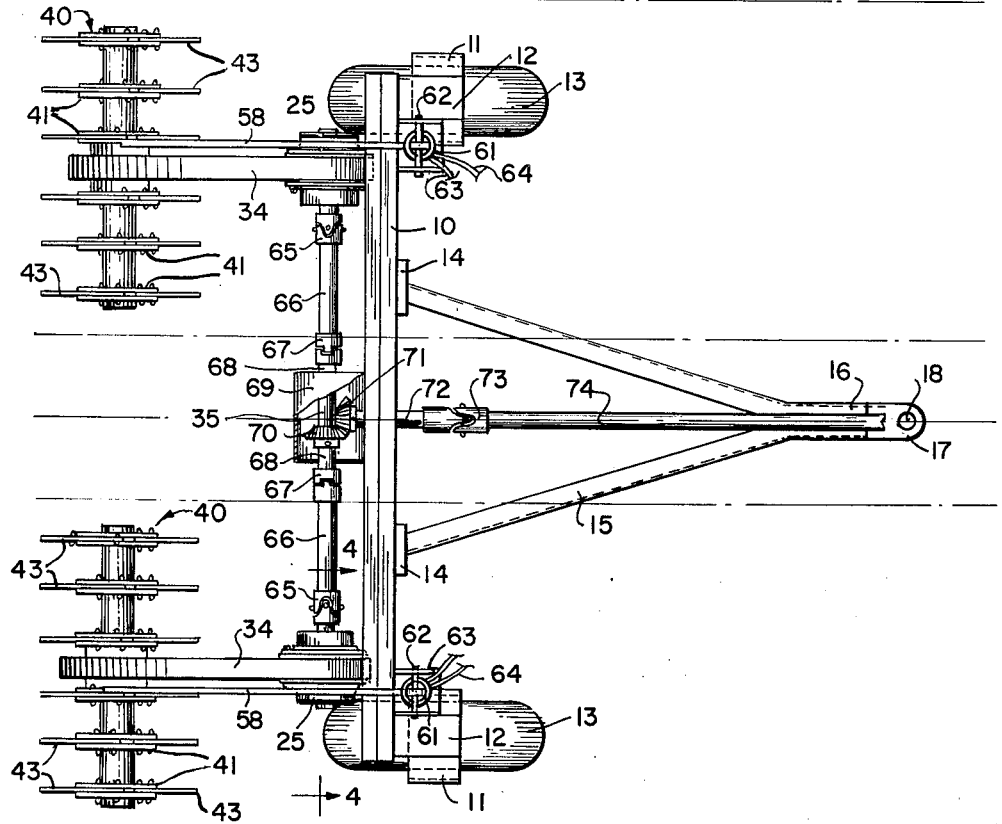

Other objects and advantages of the invention will be apparent from the following description taken in conjunction with the accompanying drawing(s) wherein:

FIG. 1 is a perspective illustrating one application of the invention.
FIG. 2, a side elevation;
FIG. 3, a top plan;
FIG. 4, an enlarged fragmentary section on the line 4—4 of FIG. 3;
FIG. 5, a side elevation of the structure of FIG. 4;
FIG. 6, a rear elevation of one of the cultivator heads; and
FIG. 7, a vertical section through the cutting head on the line 7—7 of FIG. 6.

Briefly stated, the device of the present invention is intended to be attached to a motorized vehicle such as a tractor and be drawn thereby as well as supplied with power therefrom for its operation. The vehicle comprises a transversely disposed wheel mounted frame with a transverse shaft driven through a gear box from the power takeoff of the tractor. About such transverse shaft at each side of the gear box is mounted a driving arm which extends to the central portion of an operating head including a series of disks with relatively straight bars or operating members, the drive being through said arms to a shaft on which said members are carried and with such arms capable of being raised and lowered independently to determine the earth penetration of the operating members, the raising and lowering of each arm being accomplished by means of a lever having its intermediate portion mounted on a fixed pivot with one end connected by a link to the operating head carrying arms and with hydraulic cylinders attached to the opposite ends for swinging such arms to produce the raising and lowering of the arms and operating heads connected thereto.

With continued reference to the drawings, the present invention is a combination harvester and mulcher having a cross frame 10 with a wheel yoke 11 mounted on a bracket 12 on each end and supported by ground engaging wheels 13.

A pair of depending plates 14 are welded or otherwise secured to the cross frame 10 in spaced relation along the front side thereof and such plates serve as attaching means for a tongue or draft bar having diverging arms or portions 15 and a unitary forward end 16.

To the front of the tongue is welded or otherwise secured a hitch plate 17 having an opening 18 for the reception of a coupling bolt or pin 19 so that the harvester may be attached to the draw bar 20 of a tractor 21 or other propelling vehicle.

A pair of upright support members 25 are secured by welding 26 or other means of fastening to the frame 10 and the lower end of the supports are provided with clamps including semi-circular straps 27 having outwardly turned extremities 28 secured by nuts and bolts 29 to corresponding outwardly turned flanges 30 of a second semi-circular strap 31. Bearing housings 32 are thus carried in such clamps at each side of the cultivator.

To each bearing housing 32 is attached by bolts 33 a lubricant containing housing 34, a shaft 35 being supported by the bearing housings 32 and bearings 32' retained therein. To the shaft 35 is attached a drive sprocket 36 which in turn drives a chain 37 extending lengthwise through the housing and around and drives a sprocket 38 on a shaft 39.

The shaft 39 extends outwardly of the housing 34 at each side thereof and carries a plurality of operating elements 40 each including a pair of circular plates 41 fixed to the shaft 39 by keys 42. Between each pair of mounting plates is secured a series of cutting and mulching elements in the form of bars or blades 43 secured to the plates 41 by bolts or other fasteners 44. The elements 40 are spaced along the shaft 39 and are maintained in spaced relation by spacers 45.

In order to insure quiet smooth operation, the housings 34 are filled with a sufficient supply lubricant 46 introduced through an opening 47 closed by a plug 48, a drainage opening 49 being closed by a plug 50 at the lowest point in the housing. To prevent the escape of lubricant around the shaft 35 a pair of shaft seals 51 are employed one at each side of the housing.

In the operation of the device it is desirable to raise and lower the shaft 35 carrying the members 43 and to accomplish this each of the housings 34 is provided with an upwardly extending lug or boss 52 welded or otherwise attached to the upper surface adjacent to the rear and lower end and such lug is pivotally connected by a pivot pin 53 to a link 54, the opposite end of the link being pivotally attached by a pin 55 to an operating arm 56, the other end of which is attached by a pivot pin 57 to one end of a piston rod 58 carried in a cylinder 59. The cylinder 59 has its upper end mounted on a pivot pin 60 between upright plates or supports 61 having their lower ends welded or otherwise attached to the front of the frame 10.

The operating arm 56 is supported along its intermediate portion by a pivot pin 62 in the upper end of the supporting member 25, whereby when fluid is admitted to the cylinder 59 to extend the piston rod 58, the forward end of the arm 56 will be moved downwardly and its opposite end will be moved upwardly to raise the remote end of the housing 34 as illustrated in dot and dash lines in FIG. 2.

The cylinder 59 is supplied with fluid under pressure through fluid lines 63 and 64 from the hydraulic system of the tractor to regulate the elevational position of the operating units of the harvester with the bars or cutters 43 so that such bars not only will cut the stalks of cane but will penetrate the earth and loosen the soil.

It will be understood that the members 43 may be set at the desired height merely to harvest the unharvested cane or may be lowered to further cut the stalks on the surface as well as to force them into the soil. Further the operating units may be had at maximum elevation during transportation.

In order to produce the necessary drive, the shaft 35 is attached to a universal coupling 65 carried by one end of a drive shaft 66, the opposite end of which is connected by a clutch coupling 67 connected to one end of a shaft 68 extending into a gear box 69 in which is contained a bevel gear 70 connected to such shaft driven by a bevel gear 71 fixed to a shaft 72. The shaft 72 is connected by a universal coupling 73 to a telescopic drive shaft 74 connected by a flexible coupling 75 to the power takeoff 76 of a tractor.

The device of the present invention may be used in cane fields in which unharvested stalks have been brought to a generally horizontal position during harvesting or in any well known manner whereupon further operation can be accomplished to reduce the portions of the cane left in the field to cause accelerated integration therebetween and the soil for the enhanced fertilization thereof, it being understood that as the operating units are rotated by the chains 37 driven by the sprockets 36 and the shaft 35 which in turn are driven from the gear box 69 and the power takeoff 76 of the tractor, the cutter elements 43 will engage and cut the cane and partially embed the same in the earth causing accelerated deterioration and thus utilizing the waste portions of the crops to increase the fertility of the land with greater subsequent yield.

It will be obvious to those skilled in the art that various changes may be made in the invention without departing from the spirit and scope thereof and therefore the invention is not limited by that which is illustrated in the drawings and described in the specification, but only as indicated in the accompanying claim.

What is claimed is:

A stalk mulching and disintegrating machine comprising an elongated transversely extending frame supported by ground-engaging wheels, a tongue mounted on said frame and connectable to a propelling vehicle having a power takeoff, a transmission unit carried by said frame, first shaft means connecting said transmission unit to said power takeoff, second shaft means extending transversely from said transmission unit, clutch means for selectively driving said second shaft means from said transmission unit, a vertically extending support at each end of said frame for rotatably supporting said second shaft means, a sealed housing rotatably mounted at one end on said second shaft means on each side of said transmission unit, drive means within said housing drivingly connected to said second shaft means, third shaft means connected to said drive means and extending transversely from both sides of the other end of each of said housings, a series of mulching implements fixed to said third shaft means on each side of said housings, a link pivotally connected to each of said housings adjacent said other end, an operating arm pivotally mounted intermediate its ends on each of said supports, one end of said operating arm being pivotally connected to said link, a pair of generally vertical plates connected at one end to each end of said frame and extending upwardly therefrom, independently operable generally vertical fluid means pivotally connected at one end to the other end of said plates and extending downwardly between the same and connected to the opposite end of said operating arm for controlling the position of the mulching implements relative to the earth, whereby said mulching implements can be raised or lowered and driven simultaneously or independently.

References Cited by the Examiner

UNITED STATES PATENTS

| | | | |
|---|---|---|---|
| 208,556 | 10/78 | Baird | 172—452 |
| 984,625 | 2/11 | Waterman | 172—549 X |
| 1,505,572 | 8/24 | McDonald | 172—125 X |
| 1,645,115 | 10/27 | Richardson | 172—60 |
| 2,176,261 | 10/39 | Kelsey | 172—60 |
| 2,317,188 | 4/43 | Hanson | 172—60 |
| 2,361,798 | 10/44 | Smith | 172—60 |
| 2,364,043 | 12/44 | Ariens | 172—60 |
| 2,473,770 | 6/49 | Seaman | 172—117 X |
| 2,616,348 | 11/52 | Ariens | 172—60 |
| 2,689,510 | 9/54 | Petermann | 172—60 |
| 2,793,576 | 5/57 | Carpi | 172—125 |
| 3,071,198 | 1/63 | Blocker | 172—60 X |

FOREIGN PATENTS 877,222 5/53 Germany.

ABRAHAM G. STONE, *Primary Examiner.*